No. 834,803. PATENTED OCT. 30, 1906.
W. A. HENDRYX.
APPARATUS FOR RECOVERING METALS.
APPLICATION FILED JAN. 17, 1906.

Witnesses:
Inventor:
Wilbur A. Hendryx.
By H. S. Bailey
Att'y.

UNITED STATES PATENT OFFICE.

WILBUR A. HENDRYX, OF DENVER, COLORADO.

APPARATUS FOR RECOVERING METALS.

No. 834,803.      Specification of Letters Patent.      Patented Oct. 30, 1906.

Original application filed June 30, 1905, Serial No. 267,785. Divided and this application filed January 17, 1906. Serial No. 296,566.

*To all whom it may concern:*

Be it known that I, WILBUR A. HENDRYX, a citizen of the United States of America, residing in the city and county of Denver and State of Colorado, have invented a new and useful Apparatus for Recovering Metals, of which the following is a specification.

The object of this invention is to provide an apparatus for the separation of gold, silver, copper, and other metallic values from solutions containing the same, and more particularly from cyanid solutions of the precious metals.

According to the invention such solutions are caused to pass through a filtering medium or envelop and into contact with a precipitating agent, which is covered or enveloped thereby. The filtering medium serves to separate the finely-divided ore, slime, or other suspended matter, whereby a substantially clear metal-bearing solution is presented to the precipitating agent.

For a full understanding of the invention reference is made to the accompanying drawings, wherein—

Figure 1:
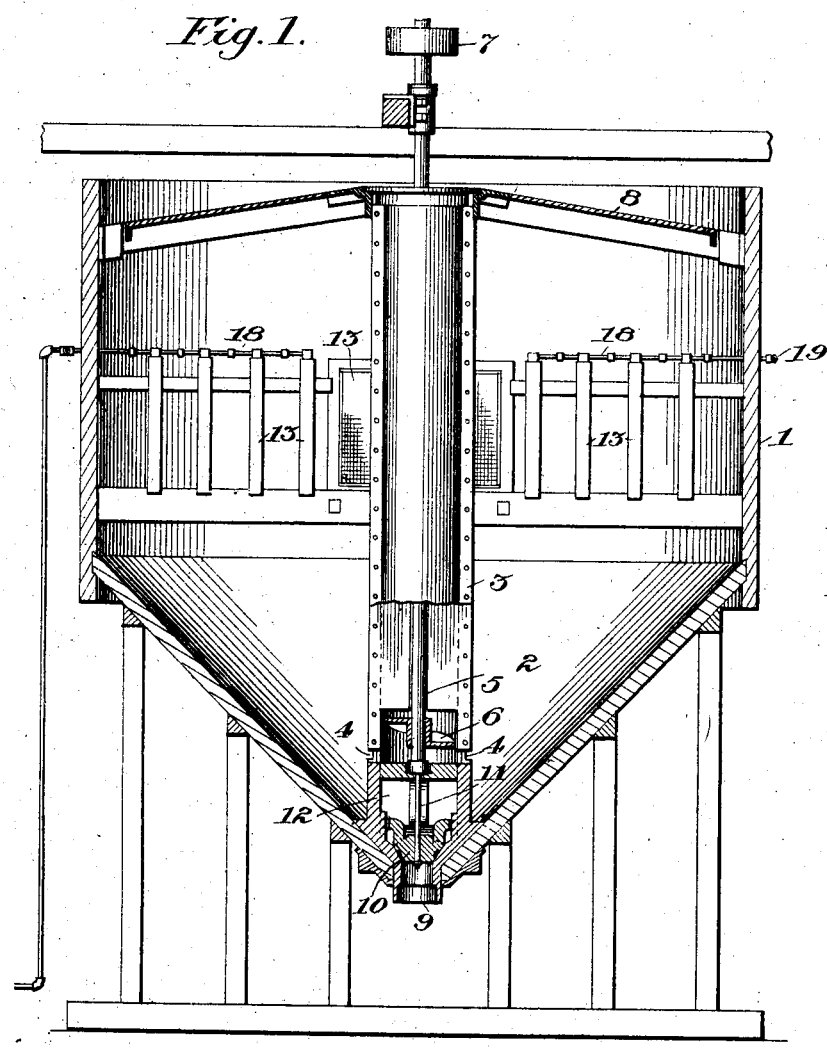
Figure 2:
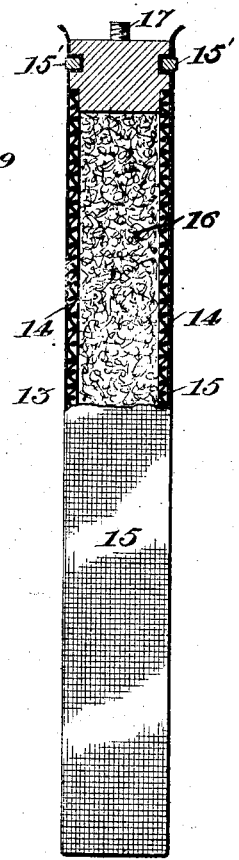
Figure 3:
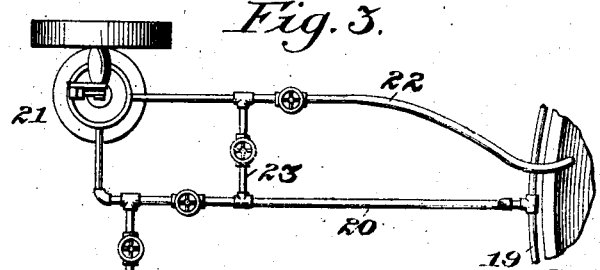

Figure 1 is a longitudinal vertical section of one form of tank embodying my invention. Fig. 2 is a transverse vertical section, partly in elevation, of one of the precipitating-cells; and Fig. 3 is a fragmentary plan view showing the pump connections.

Referring to the drawings, 1 represents a cylindrical tank having a conical bottom 2.

3 is a casing or uptake centrally disposed in the tank and communicating therewith near its lower end through apertures 4 4. Mounted within the casing in suitable bearings is a shaft 5, carrying a rotary blade 6 and adapted to be driven by a pulley 7.

8 is an apron or deflector mounted in the upper portion of the tank and arranged to receive the ore-pulp as it is discharged from the upper end of the casing 3 to expose it in a thin layer to the oxidizing influence of the air and to distribute it around the periphery of the tank 1 in such manner as to maintain the pulp in suspension without needlessly agitating the body of pulp in the tank.

9 represents a central discharge-opening for the tank, which is normally closed by a valve 10, carried by a valve-stem 11, extending loosely through the pump-shaft and carrying at its top a hand-wheel or other suitable operating device. Apertures 12 are arranged in the casing just above the valve 10.

Suitably mounted within the tank, preferably in such position as to be entirely submerged in the body of pulp therein, are a plurality of precipitating-cells 13. (Shown in detail in Fig. 2.) Each precipitating-cell comprises a framework consisting of upper, lower, and end members, the sides being preferably covered by pervious supporting plates or sheets, which in the specific form shown consist of coarse wire screens 14 14. Over the screens 14 14 I arrange a filtering medium, which may consist of sheets or plates of any suitable filtering material, (such as asbestos, cloth, felt, plates of sandstone, porous terra-cotta, silicious compositions, or any other suitable fabric or material;) but I preferably use either a canvas sack, as illustrated at 15, or sheets of canvas. The filtering medium may be secured to the frame in any suitable manner, preferably by the use of strips 15', as clearly shown in Fig. 2.

16 represents the precipitating agent contained in the cell and in position to act upon the metal-bearing solution flowing therethrough. This preferably consists of a body of zinc-shavings, but may comprise any metal, alloy, or precipitating mixture known to the art.

Each precipitating-cell 13 is provided in its top with a nipple 17, and all the cells in use are operatively connected with the suction-pipes 18 within the tank, a pipe 19 encircling the tank, and a pump suction-line 20.

22 is the discharge-pipe leading from the pump 21 to the tank 1, the discharge end of the pipe 22 being preferably arranged above the normal liquid-surface in the tank. A valved branch pipe 23 connects the suction and discharge pipes 20 22, and a valved pipe 24 is provided for the purpose of admitting air to the pump for a purpose hereinafter explained.

The operation of the apparatus is as follows: The tank 1 being filled with a pulp consisting of the finely-divided ore or slimes, together with a suitable solvent liquid, preferably a cyanid solution, the bladed propeller 6 is rotated in order to circulate the contents of the tank and to discharge the same on the deflector 8 in contact with the atmosphere, whereby a rapid and substantially complete solution of the metallic values is secured. By the operation of the pump 21, valves in pipes 20 22 being open and those in pipes 23 and 24 closed, the metal-bearing solution is continuously drawn through the filtering medium 14 of the precipitating-cells 13 and passes into contact with the precipitant 16, by which the metallic values are separated. The sheets or envelops 15, in addition to serving as filtering media, act as retainers for the precipitated metals. The clear solution from which the metals to be recovered have been wholly or in part separated passes to the pump 21 and is returned thereby to the tank 1. The ore-pulp will gradually accumulate on the outside of the filter 15 and should be removed therefrom from time to time in order to afford free passage to the metal-bearing solution. This is most conveniently accomplished by manipulating the pump-line valves as follows: The valves in pipes 20 and 22 are closed and those in pipes 23 and 24 are opened, whereby air is drawn in through pipe 24 and forced through pipes 23 and 20 into the interior of the cells 13. This air escapes through the filters 15, dislodges the pulp therefrom, and commingles it with the body of ore-pulp suspended in the tank 1. The circulation of the liquid through the precipitating-cells as above described should be continued until the values are substantially precipitated, when the contents of the tank may be discharged and the precipitating-cells removed for the recovery of the separated metal.

I do not limit myself to the particular form or arrangement of parts herein described or to the use of my precipitating-cell in a tank of the character described. The term "precipitating agent" as herein employed is intended to cover any relatively electropositive metal, as zinc or any alloy or mechanical mixture containing the same. It does not, however, include electrodes adapted for connection to an external source of current, such construction being claimed in my prior application, Serial No. 267,785, filed June 30, 1905, of which the present application is a division.

I claim—

1. A precipitating-cell comprising a filtering medium and a precipitating agent, said filtering medium being adapted to permit the ready detachment of solid matter accumulating thereon, substantially as described.

2. A precipitating-cell comprising a filtering medium and a precipitating agent, and means for passing a metal-bearing solution through said filtering medium and into contact with said precipitating agent, said filtering medium being adapted to permit the ready detachment of solid matter accumulating thereon, substantially as described.

3. A precipitating-cell comprising a filtering medium and a precipitating agent, and means for passing a metal-bearing solution successively through said filtering medium and precipitating agent, said filtering medium being adapted to permit the ready detachment of solid matter accumulating thereon.

4. A precipitating-cell comprising a filtering medium, a support therefor, and a precipitating agent, said filtering medium being adapted to permit the ready detachment of solid matter accumulating thereon, substantially as described.

5. A precipitating-cell, comprising an open frame, a filtering medium carried thereby, and a precipitating agent within said frame, substantially as described.

6. A precipitating-cell comprising a filtering medium, and a divided precipitating agent, said filtering medium being adapted to permit the ready detachment of solid matter accumulating thereon, substantially as described.

7. A precipitating-cell comprising a precipitating agent, and a filtering medium arranged to cover the same and adapted to permit the ready detachment of solid matter accumulating thereon, substantially as described.

8. A precipitating-cell comprising a precipitating agent, and a filtering medium arranged to envelop the same and adapted to permit the ready detachment of solid matter accumulating thereon, substantially as described.

9. A precipitating-cell comprising a body of metallic zinc in divided form, and a filtering medium arranged to cover the same and adapted to permit the ready detachment of solid matter accumulating thereon, substantially as described.

10. A precipitating-cell comprising an open frame, supporting means carried thereby, a filtering medium disposed upon said supporting means, and a precipitating agent within said frame, substantially as described.

11. In apparatus for recovering metals, a tank and a precipitating-cell therein, said cell comprising a precipitating agent and a filtering medium, substantially as described.

12. In apparatus for recovering metals, a tank, and a plurality of precipitating-cells therein, each of said cells comprising a precipitating agent and a filtering medium, substantially as described.

13. In apparatus for recovering metals, a tank, a precipitating-cell in position to be submerged in the material in said tank, said cell comprising a precipitating agent and a filtering medium, and means for withdrawing the metal-bearing solution from said tank through said cell, substantially as described.

14. In apparatus for recovering metals, a tank, a plurality of precipitating-cells in position to be submerged in the material in said tank, each cell comprising a precipitating agent and a filtering medium, and means for withdrawing metal-bearing solution from said tank through said cells, substantially as described.

15. In apparatus for recovering metals, a tank, means for circulating material therein, a plurality of precipitating-cells in position to be submerged in the material in said tank, each cell comprising a precipitating agent and a filtering medium, and means for withdrawing metal-bearing solution from said tank through said cells, substantially as described.

16. In apparatus for recovering metals, a tank, means for circulating and aerating material therein, a plurality of precipitating-cells in position to be submerged in the material in said tank, each cell comprising a precipitating agent and a filtering medium, and means for withdrawing metal-bearing solution from said tank through said cells, substantially as described.

17. In apparatus for recovering metals, a tank, means for circulating and aerating material therein, a plurality of precipitating-cells in position to be submerged in the material in said tank, each cell comprising a precipitating agent and a filtering medium, means for withdrawing metal-bearing solution from said tank through said cells, and means for returning the solution to the tank, substantially as described.

In testimony whereof I affix my signature in presence of two witnesses.

WILBUR A. HENDRYX.

Witnesses:
G. SARGENT ELLIOTT,
ADELLA M. FOWLE.